United States Patent [19]
Walter

[11] 4,108,006
[45] Aug. 22, 1978

[54] ACCELEROMETERS

[75] Inventor: Derek Oscar Walter, London, England

[73] Assignee: Johnson, Matthey & Co., Limited, London, England

[21] Appl. No.: 781,452

[22] Filed: Mar. 25, 1977

[30] Foreign Application Priority Data

Mar. 30, 1976 [GB] United Kingdom ............... 12747/76

[51] Int. Cl.² ............................................. G01P 15/08
[52] U.S. Cl. ..................... 73/517 R; 73/654
[58] Field of Search ......... 73/516 R, 517 R, 517 AV, 73/514, 70.2, 71.2; 310/15, 25; 340/261, 262, 195

[56] References Cited
U.S. PATENT DOCUMENTS

| | | | |
|---|---|---|---|
| 2,521,401 | 9/1950 | Ohman et al. | 73/70.2 X |
| 2,994,016 | 7/1961 | Tibbetts et al. | 310/25 |
| 3,023,626 | 3/1962 | Bonnell | 73/517 R |
| 3,965,751 | 6/1976 | Harvalik | 73/71.2 X |

*Primary Examiner*—James J. Gill
*Attorney, Agent, or Firm*—Cushman, Darby & Cushman

[57] ABSTRACT

This invention relates to accelerometers for detecting or measuring accelerations. An accelerometer in accordance with the invention includes a member which is caused to vibrate when the accelerometer is subjected to an acceleration above a threshold value. The member is capable of vibrating in more than one plane and, in vibrating, causes a change to occur in a physical parameter of the accelerometer which is other than a dimensional change due to distortion.

4 Claims, 4 Drawing Figures

ACCELEROMETERS

This invention relates to accelerometers, that is to say, to devices for detecting or measuring accelerations.

More especially, the invention is concerned with improvements in accelerometers of the type comprising a member which is caused to vibrate when the accelerometer is subjected to an acceleration above a certain threshold value. Throughout the remainder of this specification, such an accelerometer will be referred to as "an accelerometer of the type descibed."

The vibration of the member is caused to produce a signal which, in simple forms of the accelerometer may simply indicate the occurrence of an acceleration greater than the threshold value. In more sophisticated forms of the accelerometer, however, the signal may be arranged to be at least indicative of the magnitude and possibly the direction of the acceleration.

In a known accelerometer of the type described, the said member is a resilient blade of ferromagnetic material which is capable of vibrating in one plane and carries at its free end a soft iron armature. In the rest position of the blade, the armature is located between and is roughly equidistant from a pair of soft iron pole pieces which first extend away from the armature and then downwards roughly at right angles to the first direction and parallel with the blade until they are in line with the base of the blade. Between the lower end of each pole piece and the blade and in contact with the pole piece concerned and the blade, is located a bar magnet with a given one of its poles in contact either with the blade or with one side of a ferromagnetic clamping piece in which the blade is held. Thus, both N-poles may be in contact with the blade.

Finally, around the downwardly extending arm of each pole piece is located a "pick-up" coil. The accelerometer thus comprises two magnetic circuits, the blade being common to each and when the blade is set in vibration as a result of the accelerometer being subjected to an acceleration greater than the threshold value, the armature moves to and fro between the pole pieces, the magnetic flux in each of the circuits changes systematically and correspondingly varying voltages appear across the terminals of each of the coils. The terminals of the coils are, in practice, connected to a recording or indicating instrument and the appearance of the voltages is an indication that the blade is vibrating and that the instrument is being, or has been, subjected to an acceleration greater than the threshold value.

When the accelerometer is subjected to an acceleration in, or having a component in a direction parallel to the magnetic field between the pole pieces and greater than the threshold value, the blade is slightly displaced in one direction as long as the acceleration lasts. When it ceases, however, the blade oscillates to and fro between the pole pieces for a while with progressively decreasing amplitude until it comes to rest. As a result of this, a substantially sinusoidal voltage appears across the terminal leads of the coils, the initial peak value of which is related to the magnitude of the acceleration applied to the accelerometer. Thereafter, the sinusoidal output continues at the same frequency but with decreasing amplitude until the oscillation ceases. A measure of the acceleration can be obtained from the magnitude of the initial peak value of voltage or from an examination of the decrement curve, the shape of which, of course, depends upon the mechanical and electromagnetic characteristics of the accelerometer.

A disadvantage of the prior art accelerometer just described is that it can only respond to an acceleration in, or having a component in, one direction. If an indication or measurement of an acceleration in, or having a component in, some other direction is also required, two at least of such accelerometers appropriately arranged in relation to each other must be used.

An object of the present invention is to provide an accelerometer in which the above disadvantages are avoided.

According to one feature of the invention, in an accelerometer of the type described, the member which is caused to vibrate under influence of an acceleration greater than a certain threshold value is capable of vibrating in more than one plane and, in vibrating, causes a change to occur in a physical parameter of the accelerometer which is other than a dimensional change due to distortion.

According to further features of the invention:-
(a) the said member has a cross-sectional shape such that it has characteristic but different frequencies of vibration in two planes at right angles;
(b) the said member is of circular or square shape and the accelerometer is such that vibrations of the member in two given planes cause recognisably different changes to occur in the said physical parameter which are characteristic of vibrations in the said planes;
(c) the said physical parameter is the magnetic flux in a magnetic circuit in the accelerometer;
(d) the said physical parameter is capacitance;
(e) the said physical parameter is the intensity of the illumination of a photo-optical device.

According to one embodiment of the invention, the elongate member is supported at one end thereof and the accelerometer includes two magnets or magnetisable elements disposed substantially at right angles to each other in the region of the support and in the two given planes, a pole piece associated with each magnet or magnetisable element and terminating at a face confronting the member across a spacial gap at a position remote from the support, an electrical pick-up coil disposed around the elongate member at a position intermediate the support and the gap, the coil serving, when energised to produce two magnetic circuits, each circuit passing through the member, across the appropriate air gap to a magnet/magnetisable element via a pole piece, the construction of the accelerometer being such that when subject to an acceleration parallel to or having a component parallel to at least one of the two given planes, the elongate member will vibrate causing a change in the extent of at least one spacial gap and a voltage at terminals of the pick-up coil as a result of a change in flux linkages with the turns of the pick-up coil due to changes in flux of the magnetic circuits.

According to another embodiment of the invention, the elongate member is supported at one end thereof and the accelerometer includes a magnetic or magnetisable element disposed between the support and a pole piece terminating to confront the member across a spacial gap at a position remote from the support, an electrical pick-up coil disposed around the elongate member at a position intermediate the support and the gap, the said termination of the pole piece being tapered so that when the elongate member vibrates in a direction generally transverse to the direction of the tapered termination of the pole piece, the spacial gap increases or decreases by an amount dependent on the degree of vibration.

The invention will now be described by way of example, with reference to three of the accompanying drawings, in which:-

Figures 1, 2:
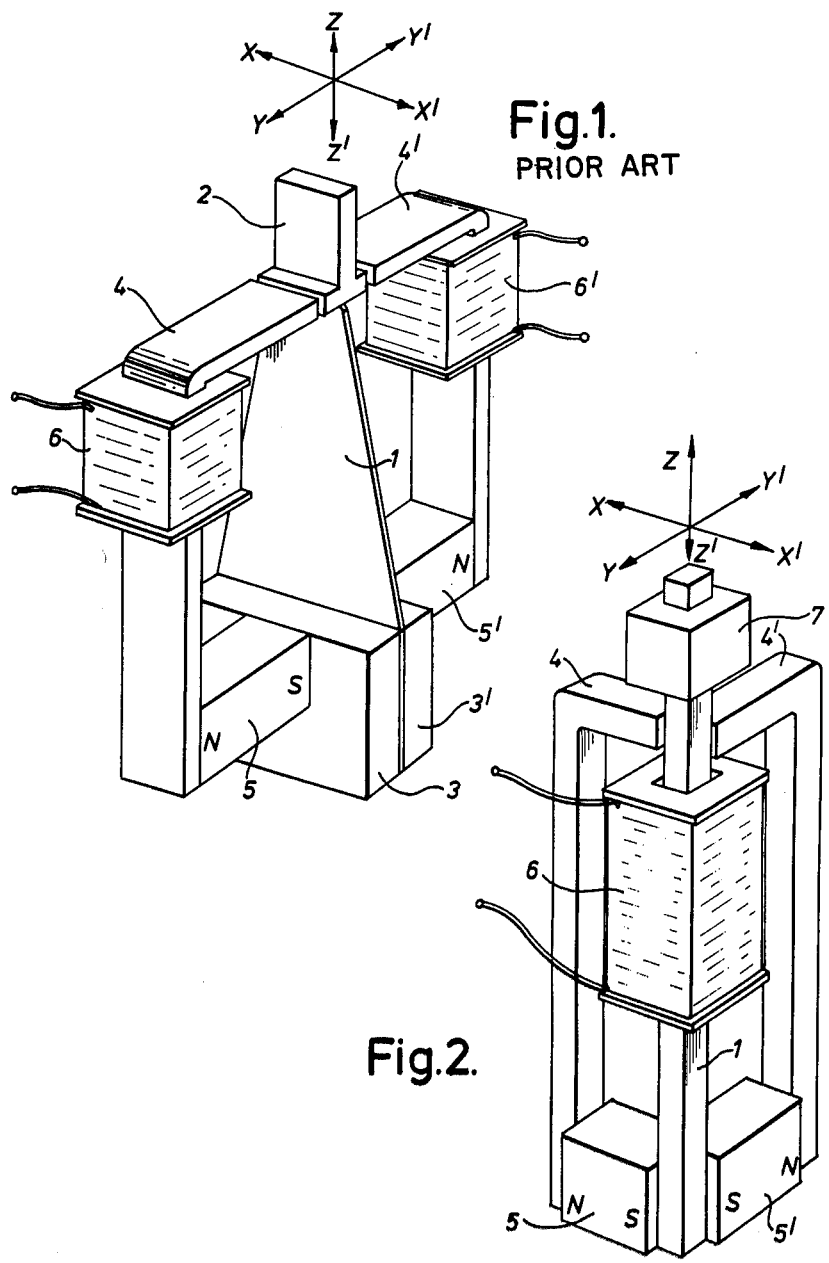
FIG. 1 is a diagrammatic view of a prior art type of accelerometer.
FIG. 2 shows diagrammatically one form of accelerometer according to the invention.

Referring now to FIG. 1, a member 1 in the form of a resilient blade as previously referred to carries an armature 2 and is able to vibrate in one plane only. In the Figure this is the Y—Y' plane. Items 4, 4' are the pole pieces, on the downwardly extending limbs of which are located pick-up coils 6, 6' with permanent bar magnets 5, 5' positioned between the ends of the pole pieces and the clamping members 3, 3' in which the base of member 1 is held.

In FIG. 2, in which like numerals have the same meaning as in FIG. 1, is shown an accelerometer according to the invention. Here, the member 1 which vibrates under the influence of an acceleration above a certain threshold value, is of square cross-section and, in the embodiment illustrated, has principal modes of vibration in the X—X' and Y—Y' planes respectively.

An acceleration or accelerations parallel to or having a component or components parallel to one or other or both of the arms 4,4' of the pole pieces, the acceleration(s) or its (or their) component(s) thus being in one or other or both of planes X—X', will cause member 1 to vibrate; will thus cause one or other or both of the air gaps between pole pieces 4 and 4' correspondingly to change in size systematically and a fluctuating voltage to appear at the terminals of the pick-up coil 6 as a result of the changing flux linkages with the turns of the coil due to the changes in the flux in the magnetic circuits 4'-1-5' and 4-1-5.

An accelerometer as illustrated in FIG. 1 will simply give an indication of the occurrence of an acceleration greater than a certain threshold value. It is possible to discriminate between accelerations parallel to arms 4 and 4' respectively by locating pickup coils on appropriate parts, say the downwardly extending limbs of the pole pieces 4,4'.

Yet again, this discrimination can be achieved by replacing the square section member 1 by a member of rectangular cross-section with, say, the larger side of the rectangular parallel to the X—X' plane. The voltage output from coil 6 will then be at a frequency characteristic of the vibration of member 1 in the X—X' plane or the Y—Y' plane or at a frequency due to the combination of these two frequencies depending upon the direction of the acceleration. In this latter case a composite voltage waveform is produced which is a combination of waveforms at the characteristic frequencies of the vibrations in the X—X' and Y—Y8 planes and having amplitudes which are dependent upon the direction of the acceleration to which the accelerometer is subjected. By analysis of such a waveform, it is possible to determine the magnitudes of the accelerations in directions parallel to arms 4 and 4' respectively. The weight 7 is adjustable in position on member 1 to enable the frequencies of vibration of the said member to be varied, within limits, at will.

Figure 3:
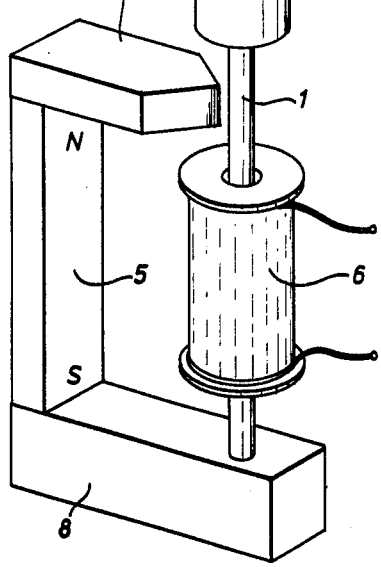
FIG. 3 shows diagrammatically another form of accelerometer according to the invention; and, FIG. 4 illustrates modes of vibration of a member of, and voltage waveforms from, the accelerometer illustrated in FIG. 3.

In FIG. 3, in which again, like numerals refer to the same parts as in the previous Figures, a permanent bar magnet 5 is located between a pole piece 4 and a ferromagnetic support 8 to which the circular crosssection member 1 is secured. Member 1 passed through a pick-up coil 6 and carries at its upper end a weight 7, the position of which may be adjusted to alter, within limits, the frequency of vibration of the member 1. Here the magnetic circuit comprises the member 1, the base piece 8, the magnet 5, the pole piece 4 and the air gap between the end of pole piece 4 and member 1.

Figure 4:
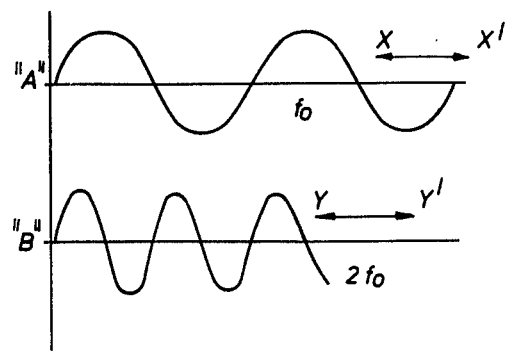
Figure 4:
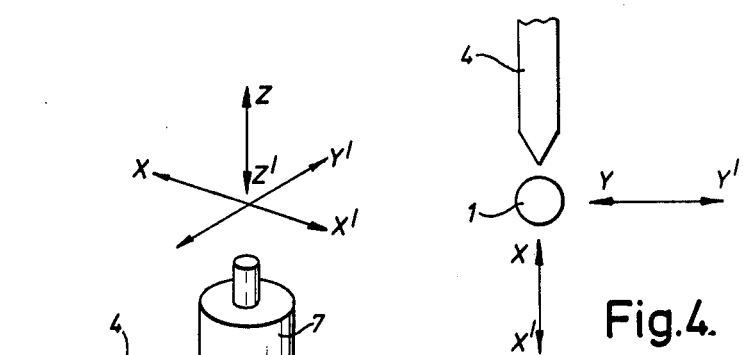

The member 1 is here able to vibrate freely in any direction other than the Z—Z' direction. If is found, however, that when the end of the pole piece 4 which is nearest to member 1 is tapered as shown, the voltage waveform appearing at the terminals of coil 6 when the member vibrates in direction of the Y—Y' plane has a frequency which is twice that which is obtained when the member oscillates in the direction of the X—X' plane. These frequencies are represented in FIG. 4 as 2fo and fo respectively where fo is the natural frequency of vibration of the member 1.

Vibration of the member 1 in any plane or planes other than the X—X' and Y—Y' planes will produce a composite waveform which is a combination of waveforms at frequencies fo and 2fo having amplitudes which are dependent upon the direction of the acceleration to which the accelerometer is subjected. From an analysis of such a composite waveform it is possible to determine the magnitude and direction of the applied acceleration.

What is claimed is:

1. An accelerometer for detecting or measuring accelerations includng an elongate member which is caused to vibrate when the accelerometer is subjected to an acceleration above a threshold value wherein the member is capable of vibrating in more than one plane and, in vibrating, causes a change to occur in a physical parameter of the accelerometer which is other than a dimensional change due to distortion, said member having a cross-sectional shape such that it has characteristic but different frequencies of vibration in two planes at right angles to one another, the vibrations of said member in two given planes causing recognisably different changes to occur in the said physical parameter which changes are characteristic of vibrations in the said two given planes, said elongate member being supported at one end thereof and the accelerometer also including two magnets or magnetisable elements disposed substantially at right angles to each other in the region of the support and in the two given planes, a pole piece associated with each magnet or magnetisable element and terminating at a face confronting the member across a spacial gap at a position remote from the support, an electrical pickup coil disposed around the elongate member at a position intermediate the support and the gap, the coil serving, when energised to produce two magnetic circuits, each circuit passing through the member, across the appropriate air gap, to a magnetic/-magnetisable element via a pole piece, the construction of the accelerometer being such that when subject to an acceleration parallel to or having a component parallel to at least one of the two given planes, the elongate member will vibrate causing a change in the extent of at least one spacial gap and a voltage at terminals of the pick-up coil as a result of a change in flux linkages with the turns of the pick-up coil due to changes in flux of the magnetic circuits.

2. An accelerometer for detecting or measuring accelerations including an elongate member which is caused to vibrate when the accelerometer is subjected to an acceleration above a threshold value wherein the member is capable of vibrating in more than one plane and, in vibrating, causes a change to occur in physical parameter of the accelerometer which is other than a dimensional change due to distortion, the elongate member being suupported at one end thereof and the accelerometer also including a magnetic or magnetisable element disposed between the support and a pole piece terminating to confront the member across a spacial gap at a position remote from the support, an electrical pick-up coil disposed around the elongate member at a position intermediate the support and the gap, the said termination of the pole piece being tapered so that when the elongate member vibrates in a direction generally transverse to the direction of the tapered termination of the pole piece the spacial gap increases or decreases by an amount dependent on the degree of taper and vibration.

3. An accelerometer according to claim 2 including a weight carried by the elongate member at a position remote from the support to produce a characteristic frequency of vibration of the member.

4. An accelerometer according to claim 3 wherein the weight is adjustable along the length of the member to vary the frequency of vibration of the member.

* * * * *